Sept. 24, 1957    R. R. EBY ET AL    2,807,204
HAY BALER WIRE TYING MECHANISM
Filed Oct. 26, 1953    6 Sheets-Sheet 6
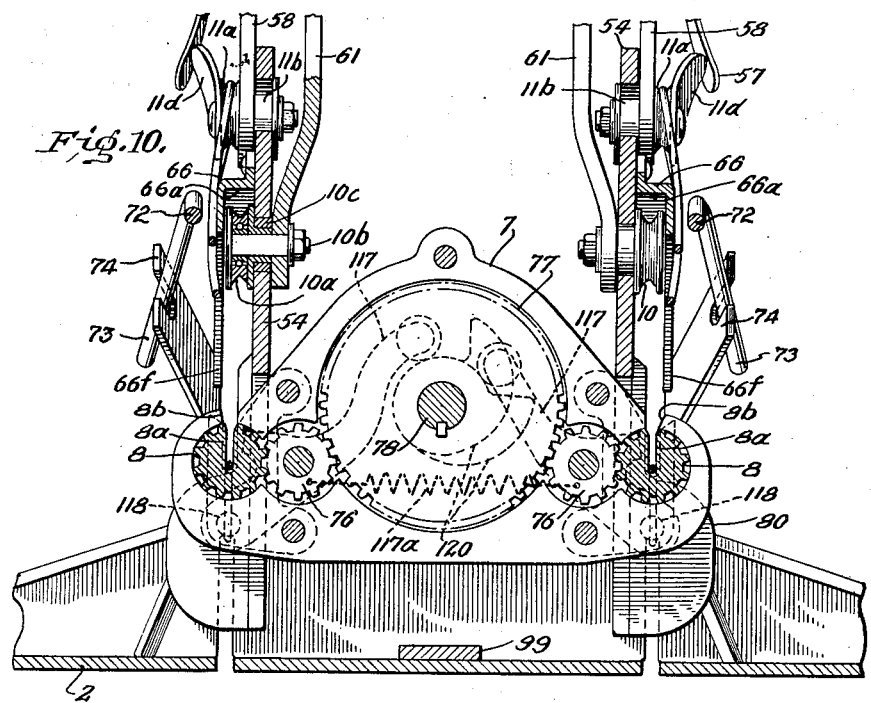
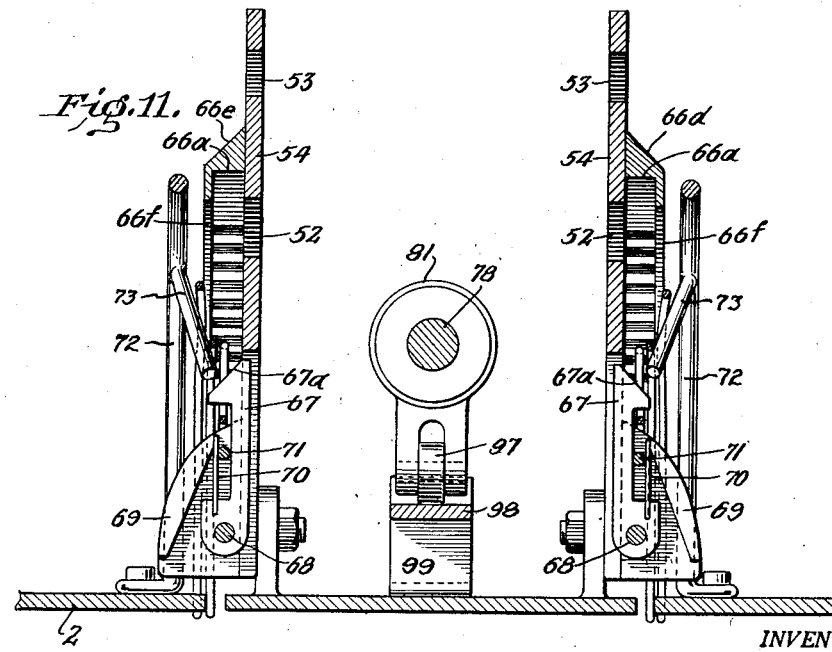
INVENTORS
Richard R. Eby
BY Edwin B. Nolt
Richard E. Babcock Jr.
Attorney

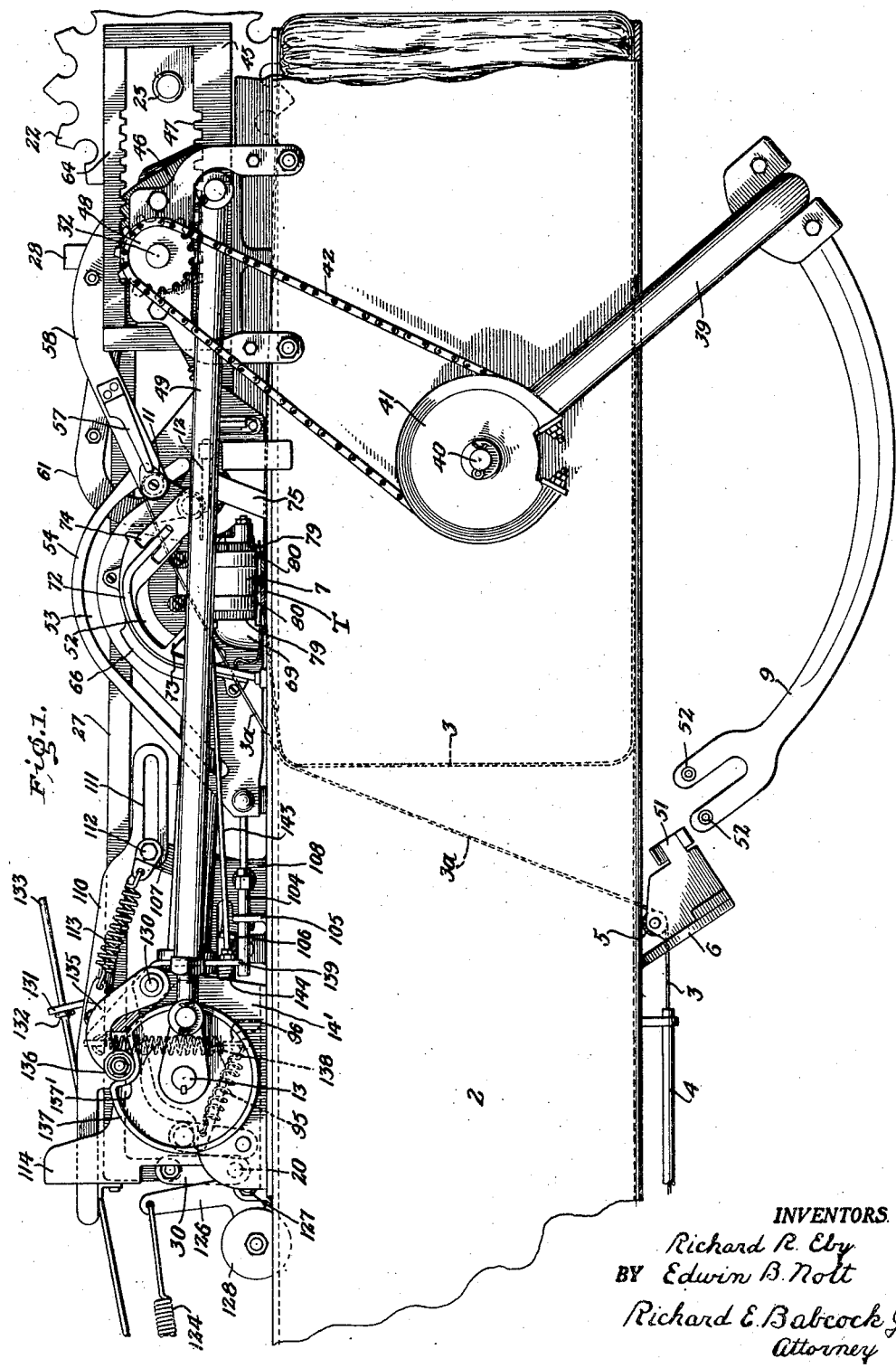

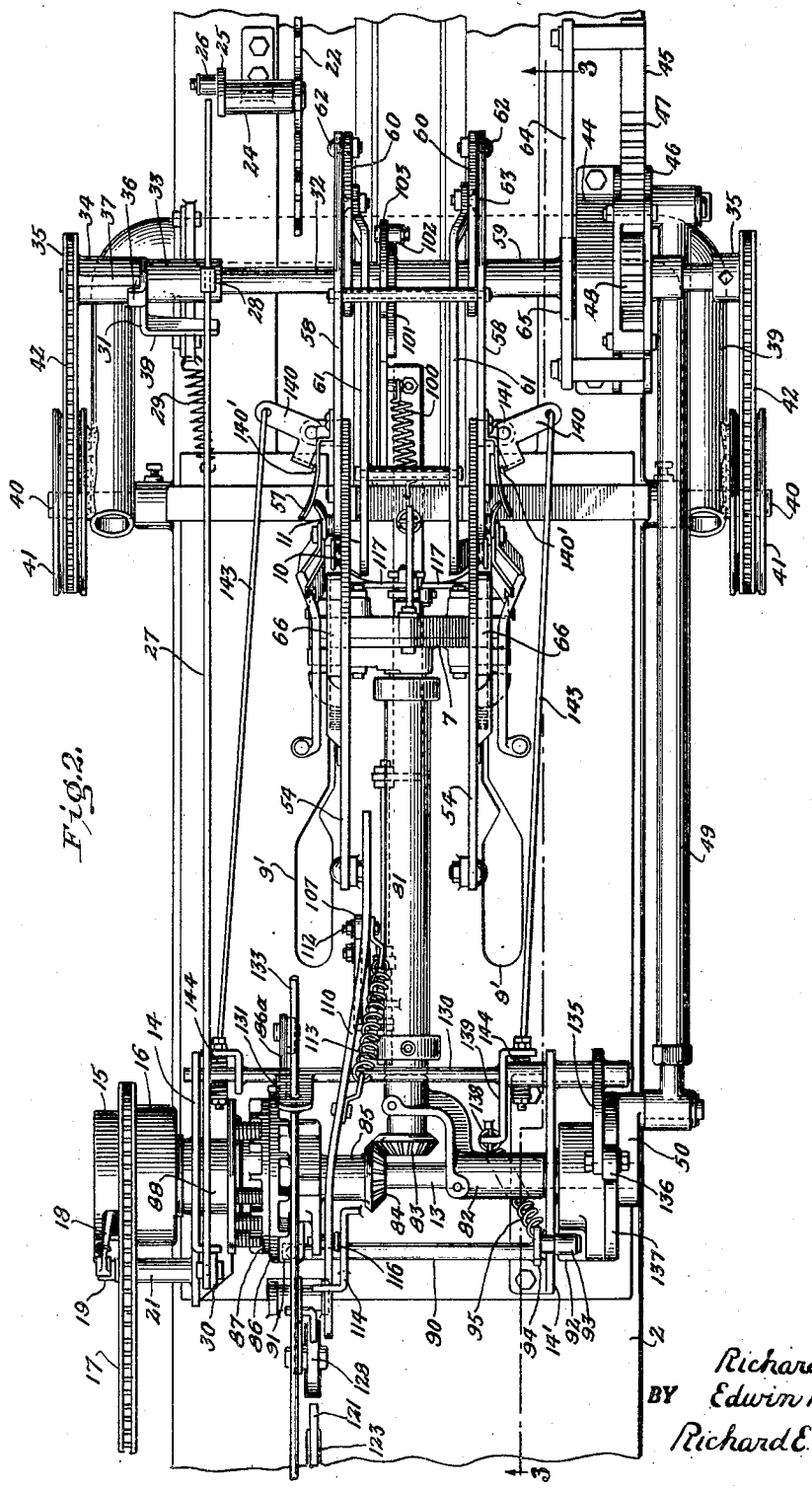

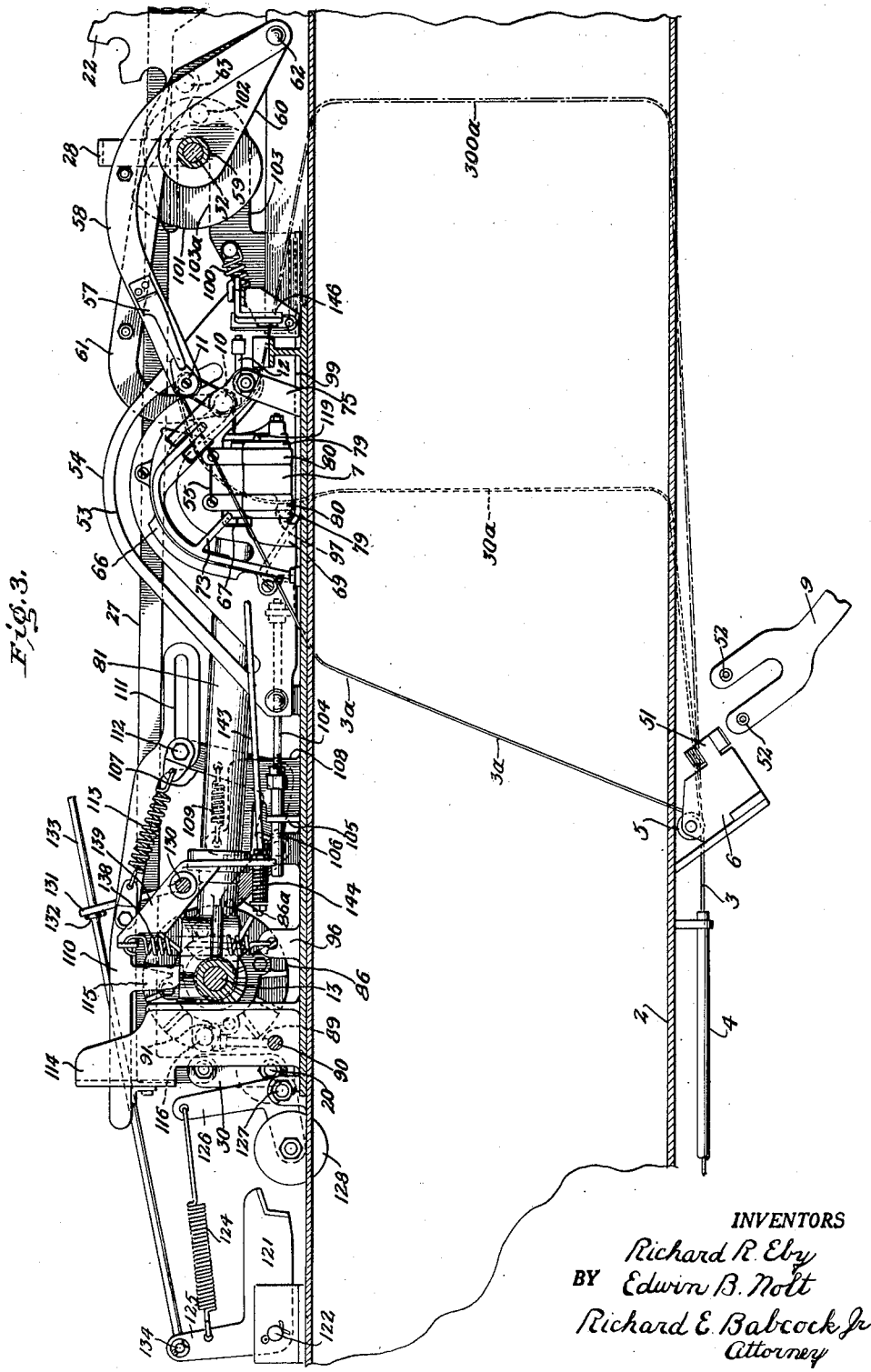

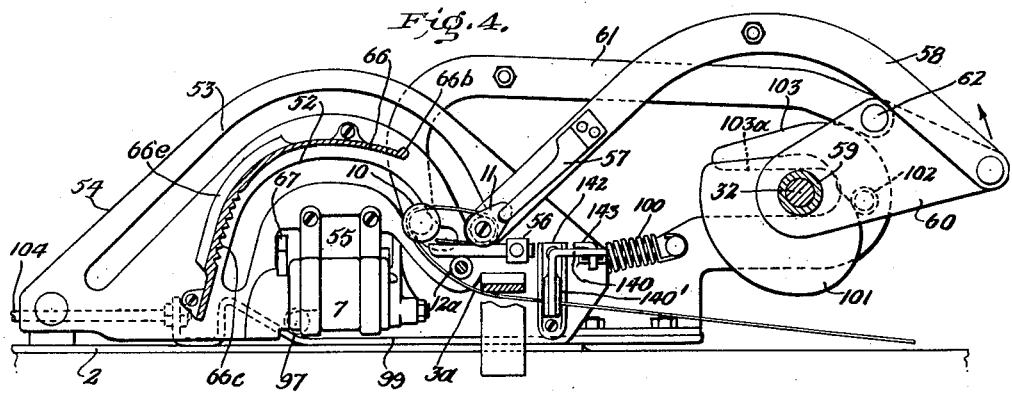
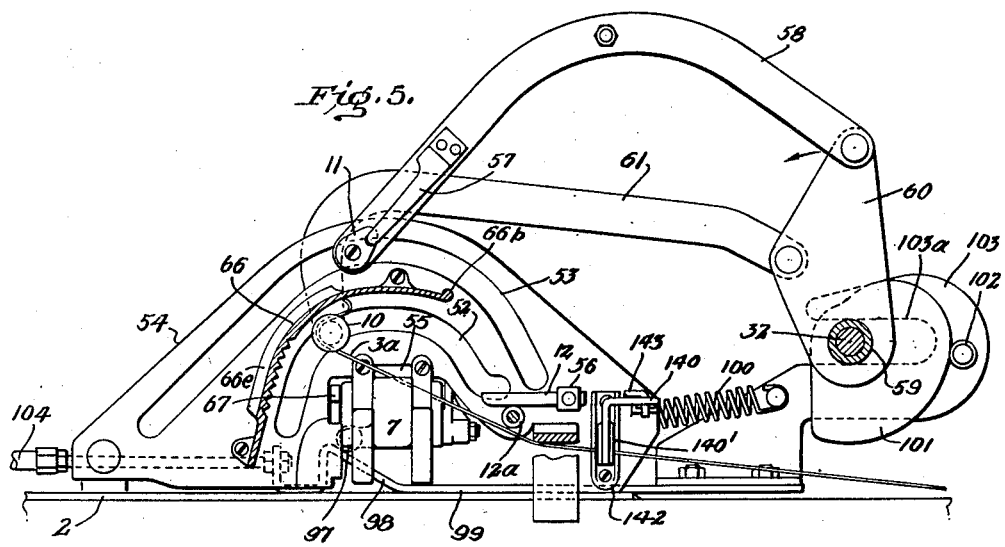
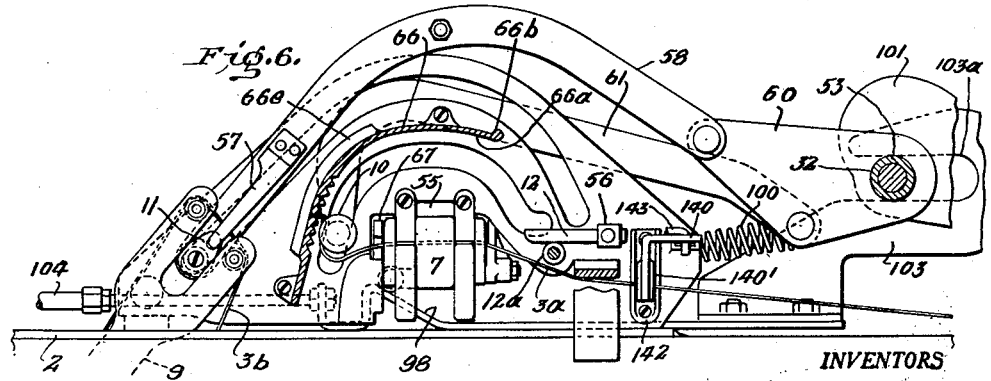

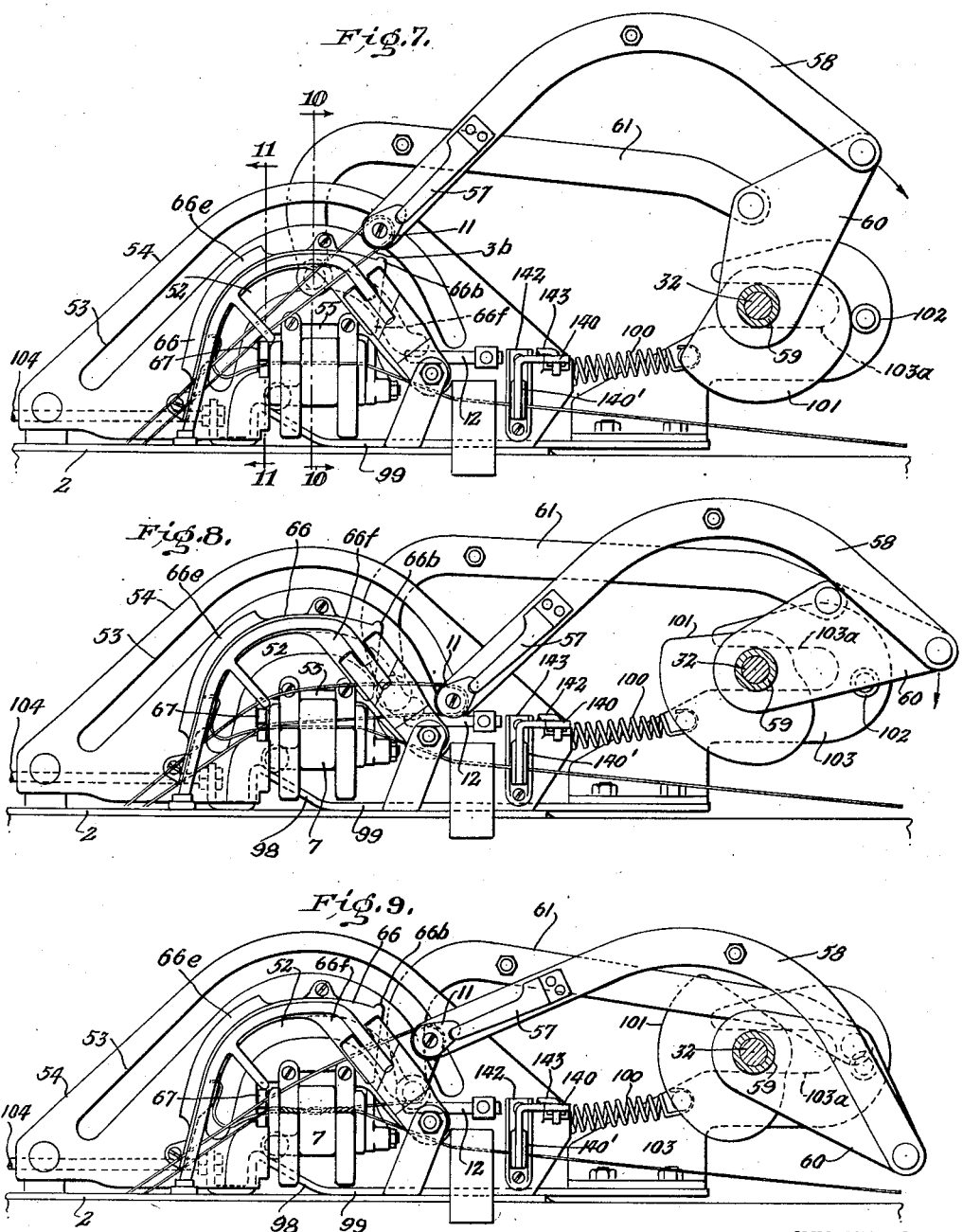

United States Patent Office 2,807,204
Patented Sept. 24, 1957

2,807,204

HAY BALER WIRE TYING MECHANISM

Richard R. Eby, Ephrata, and Edwin B. Nolt, New Holland, Pa., assignors, by mesne assignments, to Sperry Rand Corporation, New Holland, Pa., a corporation of Delaware Application October 26, 1953, Serial No. 388,132

24 Claims. (Cl. 100—23)

This invention relates to a wire tying or twisting mechanism for hay balers and the like and constitutes an improvement on the wire tying mechanism disclosed in our application Serial No. 268,424, filted January 26, 1952, for Hay Balers.

In the tying mechanism disclosed in the aforementioned application, a loop of wire projected around the rear end of the bale by a needle or shuttle device was taken from the needle by a wire carrier. A second wire carrier which had gripped the free end portion of the wire extending around the forward end of the bale then moved over the wire twister to lay the free end of the wire therein. On its return stroke this second wire carrier picked up the needle loop from the first carrier and laid one side of it also in the twister in overlapping relation to the previously laid free end. After formation of the twist, the needle loop was severed between the twist and the second carrier. The said second wire carrier included gripping means for continuing to hold its portion of the loop which then constituted the free end of the wire during formation of the next bale, and for maintaining said free end of the wire under the proper degree of tension as it was subsequently laid in the twister.

While the foregoing mechanism was found fully operative, it necessitated an extremely exact timing and interrelating of the movements of the respective wire carriers to the end that the needle loop might be both taken from the needle by the first carrier and then transferred by it to the second wire carrier and laid in the twister by the second wire carrier on its return stroke. Furthermore, the mechanism of our prior application, as well as the prior art mechanisms known to us, required that wire gripping means include movable parts be carried by the second wire carrier and actuated during movement of said carrier to release or lessen the grip of the wire therein.

With these factors in mind, it is a primary object of the instant invention to provide a simpler and more positively operating mechanism in which the wire laying function is divided between a first wire carrier and a second wire carrier, the second wire carrier functioning as heretofore to lay the free end of the bale loop in the twister on its advance stroke, and the first wire carrier then serving to pick up the needle loop and lay one side of same in the twister on its return stroke, whereby necessity for transferring the needle loop from one carrier to another prior to laying it in the twister is eliminated.

It is a further object to provide a wire laying mechanism in which a pair of wire layers or carriers engage the needle loop and the free end of the bale loop respectively, these carriers being movable successively in opposite longitudinal directions over the twister, to lay the opposite end portions of a bale wire in overlapping relation in the twister.

In accordance with the present inventive concept, the needle loop is taken in charge by the second wire carrier or free end carrier after being laid in the twister by the first wire carrier. The free end of wire then disposed around the second wire carrier is clamped between said carrier and a cooperating stationary clamp member or abutment to be thus gripped and held during formation of a new bale. Moreover a stationary wire deflector disposed adjacent the path of movement of the free end layer maintains the wire bent around said free end layer or second carrier to maintain the proper tension thereon as it is drawn around said carrier during laying of the free end in the twister.

Thus we have achieved the further important object of eliminating from the free end carrier or layer the wire gripping means formerly carried thereby, with resulting simplification and increased reliability of performance of the wire tying mechanism of the invention. Also, we have been able to dispense entirely with grippers or the like having moving parts which must be actuated independently of the wire layers or carriers during movement of the latter, as has been heretofore been required.

The best mode contemplated by us of carrying out our invention to attain the foregoing objects and advantages is illustrated in the accompanying drawings in which:

Figure 1 represents a side elevation of part of a conventional hay baler having our improved mechanism applied thereto;

Figure 2, a plan view of the structure shown in Figure 1;

Figure 3, a section on the line 3—3 of Figure 2 looking in the direction of the arrows;

Figures 4 to 9 inclusive, similar diagrammatic views showing the successive operating positions of the salient parts of the wire tying mechanism throughout a complete tying cycle.

Figure 10, an enlarged section on the line 10—10 of Figure 7; and

Figure 11, an enlarged section on the line 11—11 of Figure 7.

Referring now in detail to the accompanying drawings, the preferred exemplification of the invention is therein illustrated in its application to a more or less conventional hay baler. As shown in Figures 1, 2 and 3 such a baler comprises a rigid bale chamber 2 of hollow rectangular cross-section in which wads of hay are successively compressed and urged rearwardly (toward thre right in these figures) against previously formed bales of hay by a reciprocating bale plunger, the construction of which being purely conventional is not shown in the drawings.

In accordance with usual practice and as shown in Figures 1 and 3, one or more wires 3 each drawn from a reel (not shown) or other usual source on the baler is led longitudinally through a tubular guide 4 on the bale case 2, thence around a roller 5 supported on bracket 6 and upwardly across the interior of the bale case through openings in the bottom and top of the bale case. The free end 3a of said wire is gripped and held by means, hereinafter more fully described, on top of the bale case. As the bale is formed and moved forwardly by the plunger, it presses against said wire and draws additional wire from the coil or other source to form a loop of wire hereinafter referred to as the bale loop, extending around the forward end, top, and bottom of the bale.

Mounted on top of the bale case 2 is a wire twister comprising a housing 7 in the laterally opposed sides of which (as shown in Figure 10) are disposed more or less conventional wire twister gears or pinions 8—8. These are both mounted for rotation about axes extending longitudinally of the bale case 2 and are provided with radial slots 8a to receive the wires 3 which will be laid therein in overlapping relation through suitable openings 8b—8b in the housing 7 by the mechanisms hereinafter described. It will be apparent that the pinions 8—8 are disposed to simultaneously twist together the ends of the two bale ties or wires about each bale. In so doing each of them cooperates with a similar wire laying mechanism these mechanisms having identical components symmetrically disposed on opposite sides of the medial longitudinal plane of the bale case 2, hence the following description will be limited at appropriate times to a single such wire laying mechanism, it being obvious that this will suffice for both.

The twister gears or pinions 8—8 and the particular means employed for actuating them in timed relation to their associated mechanisms may be of conventional structure generally similar to that employed in the well known New Holland model 80 wire tie baler and as fully shown and described in the Assembling and Operating Instructions for said Model 80 Baler published by New Holland Machine Company, of New Holland, Pennsylvania. Although such details will be fully described hereinafter they constitute no part of the present invention and are not claimed herein.

Basically each of the wire tying mechanisms of the invention comprises the combination with each wire twister gear 8 of a needle or shuttle 9 for projecting a loop of wire around the rear end of a completed bale to a point in substantial longitudinal alignment with one of the gears 8 of the twister 7, and a pair of wire carriers or layers 10—11 for engaging said needle loop and the free end of the wire respectively, these carriers being movable successively in opposite longitudinal directions over the twister to lay portions of said wire in overlapping relation in the twister.

During formation of the bale, both wire carriers 10 and 11 normally are retracted to positions on one axial side of the twister and the inner wire carrier 10 cooperates with a suitable clamp element or abutment 12 to grip the free end 3a of the wire while the bale is formed.

In operation both of these carriers 10—11 are simultaneously projected and retracted along their predetermined paths of movement, while the needle 9 is actuated to deliver a loop 3b of the wire around the rear end of the completed bale. During its projection stroke the inner carrier 10 lays the free end 3a of the wire in the twister, while the outer carrier 11 moves over the twister to pick up the loop of wire 3b from the needle 9. The outer carrier 11 then completes its retraction stroke in advance of the inner carrier 10 to lay one side of the needle loop 3b in the twister and in operative relationship to the abutment or clamp element 12, whereupon the subsequently retracted inner carrier 10 operatively engages said loop and cooperates with said abutment 12 to clamp the side of the loop against the abutment. The loop 3b is then severed between the twister pinion 8 and inner carrier 10 to form a new free end for the bale tie of the next succeeding bale.

Suitable means are of course provided for guiding the lower side of the loop 3b around the relatively retarded inner carrier 10 and into the twister 8. After laying the lower side of the loop 3b in the twister, and while the inner layer 10 is completing its retraction stroke, the outer layer preferably then makes a partial projection stroke before coming to rest. Thereby functioning in novel manner to move the upper side of the wire loop 3b free of the twister before actuation thereof.

Main control shaft and tripping means

Actuation of the needles 9, wire carriers 10—11 and twister gears 8 in properly coordinated relation is controlled and timed by a primary control shaft 13 which is rotatably journalled across the top of the bale case 2 in standards 14—14'. This shaft 13 is driven at proper intervals through a conventional one revolution clutch comprising a driven member 15 keyed on shaft 13 and a driving member 16 rotatable on said shaft, the driving member 16 being constantly rotated through a chain drive 17 from any suitable source on the baler. Engagement of the driven and driving clutch members 15 and 16 to produce one complete revolution of the control shaft 13 is caused through actuation of a usual trip lever 18 on the driven clutch 15. This trip lever 18 normally abuts against a stop arm 19 fixed on a rock shaft 20 which is journalled through a sleeve 21 on a standard 14.

In accordance with usual practice, the rock shaft 20 is actuated by a conventional bale metering mechanism responsive to bale growth to rock the stop arm 19 out of the path of movement of the trip lever 18 and permit rotation of the latter together with its driven clutch member 15.

A suitable mechanism for this purpose comprises a usual metering wheel 22 having a crank shaft 23 rotatably supported in bearing 24 on the bale case, and having a serrated edge in peripheral rolling engagement with the bale through a slot in the bale case 2. Eccentrically carried by the crank 25 on said shaft 23 is a roller 26 adapted to engage the adjacent end portion of a trip rod 27. Said end portion of the rod 27 is guided for both longitudinal and vertical movement through a stationary guide 28 on the bale case and is resiliently urged into engagement with the roller 26 by a spring 29, shown in Figure 2. The opposite or remote end of trip rod 27 is pivoted to crank arm 30 on the rock shaft 20 whereby the movement of the trip rod by roller 26 will cause rearward rocking of the shaft 20 and thus will move the stop arm 19 out of engagement with trip lever 18 to permit the driven clutch member 15 to engage and rotate with driving member 16.

In order to permit resetting of the trip rod 27, and thus a return rocking of the shaft 20 and repositioning of the stop arm 19 for reengagement by the trip lever 18 at the completion of one revolution, there is provided means for lifting the forward end of the trip rod 27 above the roller 26 whereby same may be retracted over the roller 26 by spring 29 shortly after commencement of the one revolution of the driven clutch member 15 and control shaft 13. To this end, and (as shown in Figure 2) there is provided a plate 31 which is freely rotatable on a rock shaft 32 through which the needles 9 are actuated as hereinafter described. This plate 31 is disposed between one of the supporting bearings 33 of the rock shaft 32 and the hub 34 of the sprocket wheel 35 fixed on said shaft and constituting part of the needle drive mechanism. A detent 36 carried by the plate 31 is disposed for engagement by a projection 37 on the said hub to cause rocking of the plate 31 and hub 34 together during the last stages of each oscillation of the hub 34. Thus an arm 38 projecting laterally from the plate beneath the rod 27 will be oscillated to engage and lift the forward end of said rod to permit return thereof over the roller 26 of the metering wheel.

Needle mechanism

The needles 9 for the respective tying mechanisms are both supported in laterally spaced relation beneath the bale case 2 on the cross-bar of a U-shaped yoke 39, the legs of which project upwardly on opposite sides of the bale case 2 and are pivoted thereto at 40—40 for oscillation about a common lateral axis. Fixed to the yoke 39 concentrically with the pivots 40 are sheaves 41 which are driven through chains 42 from the sprockets 35 keyed on opposite ends of rock shaft 32. The bearings 33—44 rotatably support the rock shaft 32 for oscillation about a stationary axis extending transversely of the bale case 2.

A slide 45 guided for longitudinal reciprocation through bracket 46 on the bale case includes a rack bar 47 which meshes with pinion 48 fixed on rock shaft 32 to oscillate the latter. A pitman 49 operatively connects the slide 45 to a crank 50 fixed on the primary control shaft 13 whereby a complete revolution of the control shaft 13 will produce one complete reciprocation of slide 45 and hence a complete oscillation of shaft 32.

By virtue of the chain drive 42, the needle yoke 39 and needles 9—9 are swung upwardly through the bale case through the openings 9'—9' therein (Fig. 2) and then retracted. As shown in Figures 1 and 3, needle guides 51 carried by the brackets 6 will laterally position the needles 9 whereby rollers 52—52 carried on the respective furcations at the bifurcated end of each needle will engage one of the wires 3 and project a loop 3b of same upwardly through the bale case 2 around the rear end of a completed bale and present this loop above the bale case 2 for delivery to one of the wire carriers 11—11. It will be noted that the furcations at the ends of the needles are sufficiently spaced apart to permit movement therebetween of the respective carriers 11 to the end that the latter may freely engage that portion of the wire extending between the rollers 52—52 (see Figure 6 for illustration of this).

Wire laying mechanism

Each wire tying means comprises a wire laying mechanism for delivering the opposite ends of the bale wire into its associated twister.

As above mentioned, each wire laying mechanism consists essentially of the inner and outer wire carriers 10 and 11 which are guided for movement along predetermined paths which may be defined respectively by slots 52 and 53 in a vertical longitudinal disposed guide plate 54 fixed on top of the bale case 2.

The guide plates 54 for the respective wire laying mechanisms are symmetrically disposed on opposite sides of the twister housing 7 with the lateral extremities of said housing projecting through openings 55 in the respective guide plates. Also, as will be mentioned in more detail hereinafter, the twister 7 is vertically movable in said openings. As shown in Figure 10, each of the twister gears 8—8 in the opposite sides of housing 7 is disposed in a common vertical plane with its wire carriers 10—11.

Disposed adjacent the forward end of each inner slot 52 for cooperation with the wire carrier 10 is a clamping abutment preferably consisting of a stiffly resilient bar spring 12. As shown in Figures 1 and 4 to 9, the spring 12 is supported in a chuck 56 fixed on its associated guide plate with the upper operative surface of the spring 12 adjacent its free end projecting horizontally into the path of retraction of the inner carrier. Thus when fully retracted as in Figures 1 and 9, the carrier 10 will press against said spring 12 to coact therewith in gripping the free end of the bale wire 3a which extends between these elements. If desired the abutment 12 may be supported adjacent its free end by positive stop means 12a, shown in Figures 4, 5, and 6.

As shown in Figure 10 each of the inner wire carriers 10 consists preferably of a freely rotatable sheave or roller 10a supported on an axial stem 10b to receive the wire and having a guided roller 10c coaxial therewith for movement through the slot 52. Each of the outer carriers 11 includes a similar sheave 11a and guide roller 11b, and in addition includes a forwardly and outwardly flaring wire deflector 11d, for laterally displacing the wire of the needle loop 3b to one side of its sheave 11b as the latter moves through the furcations of needle 9 on its projection stroke to pick up such loop 3b. After the wire deflector 11d has passed beyond said portion of the loop in moving between the needle furcations, the tension in the wire will cause it to snap back into alignment with the roller 11a, to be operatively received thereon during the subsequent retraction stroke of the outer carrier 11. In some cases it will be desirable to provide a retainer spring 57 carried by the drive link 58 for each such outer carrier 11 and resiliently pressing against the outwardly flared forward extremity of the deflector 11d to permit easy resilient displacement thereof by, and operative reception of, the wires, but to prevent subsequent accidental removal of the wire loop from the outer carrier 11.

These wire carriers 10 and 11 of each wire laying mechanism are driven back and forth in their respective slots in properly timed relation to needles 9, by suitable mechanism which may comprise a tubular crank shaft or sleeve 59 journaled for oscillation on the rock shaft 32, each of the cranks 60—60 thereon being operatively connected by the links 61 and 58 with the respective wire carriers 10 and 11 of its associated wire laying mechanism. The links 61 are pivotally connected to the cranks 60 at 63 in circumferentially advanced relation to the pivotal connections 62 between the links 58 and cranks so that when the inner wire carriers 10 are at rest in their retracted positions as in Figure 1, with each inner carrier 10 pressed against and in clamping relation with its abutment 12 to hold the free end of the wire 3a, the pivotal connections 63—63 of the links 58 and cranks 60 will have oscillated beyond the dead center position to advance the outer carriers 11 somewhat from their extreme retracted positions. Thus the outer carriers 11 will come to rest in positions raised above the twister pinions 8 and abutments 12 to raise the upper strand of the needle loops 3b out of the twisters 8.

The tubular crank shaft 59 is oscillated simultaneously with but in opposite directions to the needle rock shaft 32, by means of a downwardly disposed rack bar 64 carried on the slide 45 in laterally offset relation to the needle drive rack 47 and in meshing engagement with a pinion 65 keyed on the tubular crank shaft 59. Thus it will be seen that each reciprocation of the slide 45 responsive to rotation of the primary control shaft 13 will produce a simultaneous relatively coordinated actuation of the needles 9 and wire carriers 10 and 11.

Wire deflecting and guiding means

In order to place a drag on the free end 3a and maintain it under tension for proper reception in the twister 7 there is provided a wire deflector 66 fixed to each guide plate 54 between its slots 52—53. This deflector is provided with an under surface 66a overhanging and substantially contiguous to the path of movement of the inner wire carrier 10. At its forward end this deflector is provided with or terminates in a rounded lip 66b somewhat rearwardly of the fully retracted positions of the wire carriers 10 and 11.

During formation of the bale the free end 3a of the wire normally extends around both carriers 10 and 11 and is clamped between carrier 10 and abutment 12 as in Figure 1. As the carriers 10 and 11 commence their tying cycle, the carrier 11 is first retracted towards the abutment 12 as the carrier 10 moves away from said abutment to release said free end, as is shown in Figure 4. As the carriers 10 and 11 continue their tying cycles they move upwardly as in Figure 5 on opposite sides of the lip 66b. In so doing the outer carrier 11 bends the extremity of the free end 3a upwardly and reversely around this lip. When subsequently drawn beneath deflector 66 by continued movement of the inner carrier 10, the dragging engagement between the end of the wire and the lower face 66a of the deflector 66 maintains the free end portion 3a of the wire under sufficient tension to facilitate its reception in the twister 7.

Once the free end 3a has been laid in the twister as in Figure 6 it may be retained thereby engagement between the upwardly turned bitter end of its free end portion 3a and a series of teeth or serrations 66c on the lower face of the deflector. Such holding or retaining action of the teeth 66c may be supplemented, or in fact supplanted if desired, by a spring projected latch 67 pivoted at 68 on the forward end face of the stripper element 69 carried by guide plate 54 as shown in Figure 11. In such arrangement one end of a leaf spring 70 fixed on the latch 67 presses against a stop 71 on stripper element 69 to resiliently project the upper hooked end of the latch. Said hooked end is provided with a sloping cam face 67a whereby the downwardly moving wire may retract the latch temporarily while moving downwardly beneath the hooked upper end thereof, whereupon the latch will instantaneously be projected outwardly by the spring 70 to retain the free end 3a.

It will be seen from Figure 6 that as the inner carrier 10 completes its projection stroke to lay the free end 3a in the twister 7, the outer carrier 11 is similarly completing its projection stroke and will have moved between the furcations of the needle 9 to pick up the needle loop 3b therefrom, the needle having also completed its projection stroke at the same time.

Since the outer carrier 11 is retracted in advance of the inner or free end carrier 10, provision must be made for guiding the lower strand of the needle loop 3b around and beneath the inner carrier 10 for movement into the twister 7, while withholding the upper strand of the needle loop. To this end the deflector 66 is provided at least at its rear end portion adjacent the needle 9 with a downwardly and outwardly sloping deflecting surface 66e, Figure 11, for laterally deflecting the lower strand of needle loop 3b as in Figure 7 as the latter is pulled forwardly by the outer carrier. This causes the needle loop 3b to ride downwardly along the outer face of deflector 66 past inner carrier 10 as may best be seen by reference to Figure 7 of the drawings.

In order to then guide the lower strand of the needle loop 3b beneath the inner carrier 10 and into the twister 7 as shown in Figure 8, there is provided a wire guide 72 fixed on bale case 2 and provided with an inwardly sloping depending guide finger 73 on the needle side of twister 7. A downwardly and inwardly sloping guide plate 74 supported by bracket 75 on the bale case 2 is disposed on the opposite side of twister 7 with its lower end lying contiguous to the side of abutment 12. Thus as the lower needle loop strand is fully laid in the twister 7 and the outer carrier 11 is retracted substantially to the abutment 12 in Figure 8, this plate 74 guides said lower needle loop strand into the abutment 12. As shown in Figure 10, a smooth transition of the wire strand from the guide 72 onto the guide plate 74 is provided by notching the outwardly flaring free end of the said plate 74 to receive the outwardly flaring free end of wire guide 72.

It will be seen in Figure 8 that the outer carrier 11 is retracted against the abutment 12 to lay the wire strand thereon before the retraction of the inner carrier 10 is completed. Then as shown in Figure 9, during the completion of the retraction stroke of inner carrier 10 to clamp the lower wire strand of needle loop 3b against abutment 12, the outer carrier 11 is raised upwardly from this end abutment to raise the upper strand of the needle loop 3b and hold the said strand clear of the twister 7 during the ensuing actuation of the latter.

The outer face of the deflector 66 is defined preferably by depending flange 66f, Figure 11, lying outside of the path through which the inner carrier 10 moves and serving to confine the free end of the wire 3a beneath said deflector. At its forward terminus the said flange 66f is preferably vertically enlarged to function as a wire separator depending almost to the level of the raised twister 7, so that when the lower strand of the needle loop 3b has been carried beneath the said separator and into the twister 7 by the combined action of the outer wire carrier 11, guide plate 74, and guide finger 73, the upper strand of said loop 3b will be still maintained on the outer side of the separator and thus outside the path of retraction of the inner carrier 10.

Wire twisters

As aforementioned the wire twister 7 associated with each set of inner and outer wire carriers 10 and 11 includes a usual radially slotted twister gear 8 (Figure 10), said gears 8 being preferably mounted for rotation in opposite sides of the common twister housing 7 about axes extending longitudinally of the bale case 2 and being driven through idler gears 76—76 from a common drive gear 77 keyed on drive shaft 78, one end of which is journalled through said housing. Normally the twister gears 8—8 are at rest with their radial slots 8a opening upwardly as shown in Figure 10, and the housing 7 is slotted or cut away at 8b—8b at locations registering with these slots 8a in the positions which they assume when their respective gears are at rest, whereby wires may be laid along side each other in these slotted twister gears 8 for forming a twist.

Mounted on the twister housing 7 in spaced relation from the portions thereof which enclose the respective twister gears or pinions 8—8 are usual anvils 79. A pair of such anvils 79—79 is axially aligned with the opposite ends of each twister pinion 8 and each anvil 79 is provided with a wire receiving upwardly opening slot substantially as disclosed in the Eby-Nolt U. S. Patent 2,528,538 of November 7, 1950, in axial registry with the slot 8a of its respective twister pinion 8 when the latter is stationary. It will be seen that as the twister pinion 8 rotates the wires therein are twisted between it and its respective anvils, the twist being formed in the spaces between each twister gear 8 and its associated anvils and the openings 8b in the housing 7 being large enough to permit the formation of such twist.

The housing 7 is mounted between the guide plates 54 for vertical movement therebetween, with its opposite sides or portions which includes the pinions 8—8 projecting through and vertically movable in the openings 55 in the respective side plates.

Fixed on each side plate 54 is a pair of wire stripper elements 80—80 which freely depend between said twister housing 7 and the anvils 79—79.

Also it is desirable to provide on each side plate a rearwardly disposed stripper element 69, the outer surface of which converges rearwardly toward the face of plate 54 and slopes downwardly and outwardly from said face to thus guide the bale tie around and past said housing 7.

The arrangement is such that when the twister housing 7 is raised to operative position as in Figures 5 and 6, the slots 8a and 79a in the twister gears and anvils respectively are raised above the strippers in positions such that wire strands may be laid in said slots and twisted together by rotation of the twister gears 8—8. However, when the housing 7 is lowered, relative to the strippers 80 and 69 to the position of Figure 9, the upper surfaces of the strippers engage the twist and strip it from said slots, whereupon the completed wire tie or twist is free to move outwardly and downwardly over the rounded surfaces of the strippers toward the completed bale.

The twister housing 7 is supported at one end of a tubular housing 81 for vertical swinging movement (or in other words raising and lowering) about the axis of the primary control shaft 13, by means of a bearing 82 at the other end of said tubular housing journalled on said shaft 13.

The twister drive shaft 78 is rotatably disposed through and supported in said housing and has a bevel pinion 83 fixed thereon externally of the housing 81 in mesh with a bevel gear 84 rotatable on control shaft 13. Bevel gear 84 is connected through a sleeve 85 to the driven member 86 of a frictional twister clutch, similarly rotatable on said shaft. Said driven clutch member 86 is in constant frictional engagement with the constantly rotating driving member 87 of said clutch which is similarly rotatable on shaft 13 and is connected through a sleeve (not shown) journaled about the shaft 13 within the bearing 88 for rotation with the constantly rotating needle clutch member 16. Normally, however, the driven twister clutch member 86 is held motionless by means of a stop arm 89 on rock shaft 90 abutting against an axially projecting stop 91 on said clutch member and causing slippage between it and its driving member 15. Rocking of the shaft 90 to disengage the arm 89 from stop 91 and permit driving of the twister gears 8 is accomplished under control of a cam 92 fixed on the primary control shaft 13 and engaging a roller 93 in the end of a radial control arm 94 on rock shaft 90. The lobe of said cam 92 is so disposed as to momentarily rock the shaft 90 and free the driven clutch member 86 just prior to termination of each revolution of the main shaft 13 and hence just as the needle 9 and carriers 10 and 11 terminate therein action of laying the wires in the twister 7. It will be seen that at the end of the revolution of the primary shaft 13 the lobe of cam 92 will have passed beneath the roller 93 and the stop arm 89 will be returned to its position of abutment against the stop 91 upon completion of one full revolution of the driven twister clutch member 86. Such return movement may be produced by the tension spring 95 connected between the control arm 94 and the bracket 96 on the bale case.

If desired a pawl 86a may be pivoted on the bale case 2 for operative engagement with the radial cooling fins of the driven clutch member 86 to prevent rearward rotation of the latter by manual actuation of the baler flywheel such as might damage the cutter actuating cams 120 or their cooperating levers 117.

*Stripping action*

Raising and lowering of the twister housing 7, as required to render it operable to receive and twist wire strands and then to strip or reject same, is produced under the joint control of the tubular crank shaft 59 and primary control shaft 13. To this end the twister housing 7 is supported by means of a roller 97 carried thereby in operative rolling engagement with an inclined portion 98 of slide 99 which is movable longitudinally beneath roller 97 to raise or lower the housing 7, as is best illustrated in Figures 4 to 9 and 11 inclusive.

Normally the slide 97 is resiliently urged towards the left in Figure 3 by means of a tension spring 99a connected between said slide and a suitable fixed point on the bale case. In this position the inclined portion 98 of the slide is removed from beneath the roller 97 and the twister housing is lowered.

Movement of slide 99 toward the right to raise the twister 7 for reception of the wires is produced simultaneously with actuation of the needles 9 and wire carriers 10 and 11, by means of a cam 101 fixed on the tubular crank shaft 59 in operative peripheral engagement with a roller 102 rotatably carried on a bracket 103 fixed to the slide 99. Preferably the bracket 103 is provided with a longitudinal slot 103a receiving the tubular crank shaft 59 and preventing vertical displacement of the slide in response to the forces imposed thereon due to the coaction of the cam 101 and roller 102.

Thus it will be seen that on the initial movement of the cam 101 from the position of Figure 3 to the position of Figure 5, the slide is moved rearwardly to move the inclined portion 98 beneath roller 97 and to fully raise the twister housing 7. In such raised position, the twister 7 and anvils 79 are disposed to operatively receive the wires which are laid therein by the action of the wire carriers. It will be noted that such raising of the twister 7 is completed preferably just as the free end of the wire commences to be laid therein by the inner wire carrier 10 as in Figure 5.

In order to prevent lowering of the twister housing 7 on the return movement or oscillation of the tubular crank shaft 59, the slide comprises a rearwardly projecting extension or rod 104 movable through a guide 105 on the bale case 2.

A latch 106 carried by bell crank lever 107 pivotally mounted on bracket 108 is spring loaded at 109 to be resiliently projected downwardly behind the end of rod or extension 104 as the latter is retracted forwardly with the slide 99 responsive to movement of the cam 101.

Release of the latch 106 with resulting rearward return movement of the slide 99 and lowering of the twister housing 7 is deferred until completion of the twists and severing of the needle loops between the twister 7 and the inner wire carriers 10 to form new free ends which are held across the bale casing by the coacting inner carriers 10 and abutments 12 during formation of the next bale. Accordingly, such release of the latch 106 is controlled from the driven twister clutch member 86 through an appropriate trigger mechanism which comprises the inertia element 110 movable longitudinally of the bale case 2 and having a lost motion connection defined by the slot 111 and pin 112 (Figure 3) with the upper end of bell crank lever 107. A spring 113 connected between brackets on the inertia element 110 and pin 112 resiliently urges the element 110 rearwardly to the position of Figure 3 in which the rearward or left end of slot 111 abuts against the pin 112 at the forward limit of lost motion of the element 110 relative to the lever 107.

It will be seen that the rearmost end of the inertia element 110 is slidably supported at a predetermined level through the guide 114 on the bale case. A depending finger 115 fixed on the element 110 is disposed for operative engagement with an eccentric pin 116 carried by the driven twister clutch member. Thus during the latter portion of the single operative revolution of this twister clutch member 86 (in a counterclockwise direction as seen in Figure 3) the pin 116 will engage the finger 115 and draw the element 110 rearwardly against the action of spring 113, the lost motion connection 111—112 meanwhile permitting the latch lever 107 to remain stationary with its latch 106 operatively engaged with the end of rod 104 to retain the slide 99 in its forward position with the twister housing 7 raised.

Pin 116 is so positioned on the clutch member 86 and so related with the depending finger 115 that it rotates downwardly and disengages the latter at the completion of the operation of the twister. The spring 113 then acts to instantaneously project the element 110 forwardly, causing the rear end of its slot 111 to impact sharply against the pin 112. This swings the latch lever 107 forwardly, raising latch 106 out of engagement with the end of rod 104 and permitting the rod 104 and slide 99 to move rearwardly under the actuation of spring 100. This results in lowering the twister housing 7 and stripping the completed twists or ties from the twister gears 8.

*Wire severing means*

The twister drive shaft 78 is driven from main control shaft 13 through the clutch member 87, 86 and through the gears 84, 83 which have a 1 to 1 ratio, so that each complete revolution of the main control shaft 13 will result in one complete revolution of the twister drive shaft 78. Inasmuch as the drive gear 77 shown in Figure 10 on twister drive shaft 78 has a multiple of the number of teeth on the twister gears 8, it will be seen that single revolution of the main control shaft 13 will result in several revolutions of the respective twister gears.

As the twisting of the wires is substantially completed, it is of course desirable to sever the wires of the needle loops between each twister gear 8 and its associated abutment 12 and inner wire carrier 10 to thus leave a free end 3a of wire gripped and held across the bale case 2 as in Figure 1 preparatory to the forming and banding of the next succeeding bale. A suitable mechanism for accomplishing the severing of the wires is illustrated in Figure 10 in which each of the wire cutters comprises a lever 117 pivoted at 118 on the twister housing 7 and having a cutter element 119 thereon at a level to engage and sever only the lowermost side of the needle loop 3b. Each wire cutter 119 is swingable across the slot of the foremost anvil 79 of its associated twister in shearing relation with the edges of said slot in well known manner as in the New Holland model 80 wire tie baler, produced by New Holland Machine Division of The Sperry Corporation, New Holland, Pennsylvania. The twister drive shaft 78 projects forwardly through the twister housing 7 and has keyed on its projecting end a pair of cams 120—120 disposed to actuate the respective cutter levers 117—117 through engagement with follower rollers 121—121 on the ends thereof. It will be noted that the cams 120 and their respective rollers 121 are disposed in different planes axially of the shaft 78 to avoid interference with each other and that the lobes of the respective cams are disposed to actuate their associated cutter levers 117 in the final stages of operation of each twister just prior to the stripping thereof. The levers 117 are resiliently urged toward their respective cams 120 by a tension spring 117a connected between them.

Plunger latch

In most applications it will be desirable to hold the bale plunger forwardly and maintain the bales under compression during the tying cycle substantially as in the Edwin B. Nolt U. S. Patent 2,236,628 of April 1, 1941. In order to attain this end and as shown in Figure 3, a usual plunger latch 121 is pivoted at 122 on the bale casing whereby its operative free end may be swung downwardly through an opening 123 (Figure 2) in the bale case for operative engagement behind the plunger after the latter has moved therebeneath on its compression stroke. A normally contracted tension spring 124 is connected between the actuating arm 125 of the latch and one arm 126 of a bell crank lever which is pivoted on the bale case at 127 and has a roller 128 carried by its other arm for operative rolling engagement with the plunger through an opening in the bale case. Such engagement will of course rock the lever 126 and through it will exert a tension on spring 24 sufficient to move the latch 121 to operative position in engagement with the rear of the plunger.

Normally, however, the latch 121 is retained in a retracted or inoperative position as in Figure 3 by a control shaft 130 (Figure 2) having an arm 131 thereon normally engaging an enlargement 132 on a push rod 133 and transmitting a retracting force therethrough to the latch. It will be seen that the actuating arm 125 of the latch is pivoted at 134 to the rod and the latter in turn is supported for sliding movement in one direction (to the left in Figure 3) through an opening in the arm 131. A follower arm 135 similarly fixed on the shaft 130 supports a roller 136 in operative engagement with a cam 137 fixed on the main control shaft 13 (Figures 1 and 2). A spring 138 connected between lever 139 on the shaft 130 and bracket 96 on the bale case biases the roller 136 into engagement with the cam. This spring is stronger than the latch actuating spring 124 and is thus capable of overpowering such spring to retract the latch. Normally the roller 136 rests in a recess 137' in the cam, as in Figure 1, to maintain the shaft 130 in a position of rotation such that the arm 131 abuts against the enlargement 132 on rod 131 to maintain the latch 136 inoperative. However, immediately upon inception of the tying cycle, initiated by rotation of the primary control shaft 13 and cam 137, the roller 136 will move out of the recess 137' to rock the shaft 130 in a clockwise direction in Figure 1. This will move the arm 131 away from abutment 132 and will permit the spring 113 when properly tensioned by the bell crank lever 136, to move the latch 121 into operative engagement with the plunger.

Thus latch 121 will hold the plunger at the advance end of its compression stroke, while the tying cycle occurs. When the primary control shaft 13 has completed its one revolution, the follower roller 136 will again be received in the cam recess 137'. The ensuing rocking of shaft 130 will cause the arm 131 to abut against enlargement 132 on rod 133 and to act through said rod in retracting the latch from its engagement with the plunger, whereupon the plunger will be free to resume its reciprocation in the manner disclosed in the said Nolt patent.

Bale case clamps

In order that the free end of the wire 3a may not be pulled away from the inner wire carriers 10 by the action of needles 9 which move simultaneously with the wire carriers, it is desirable to provide suitable clamping means operable simultaneously with the actuation of the needles 9 for gripping and holding the free ends 3a.

As shown in Figures 2, and 4 to 9 inclusive, each such clamping means may comprise a bell crank lever 140 pivotally mounted at 141 for lateral swinging movement on its guide plate 54 and having a carbaloy or other hard metal clamp element 140' thereon for cooperation with a stationary clamp element 142 fixed on the plate 54. These clamps, which are of normally open, are linked at 143—143 to the lower ends of the arms 139 on the rock shaft 130, whereby rocking of the shaft through cooperation of the cam 137 and roller 136 as above mentioned responsive to initiation of the needle and carrier movement will close the clamp elements against the wires therebetween, it being noted that each clamp mechanism is disposed in the path through which the free end portions of the wires are drawn by the bale movement.

Preferably the links 143 are slidable through openings in their associated levers 139 and the actuating force of each lever is transmitted to its said link through a compression spring 144 (see Figures 1, 2, and 3) whereby resilient clamping action will be exerted on the free ends 3a of the bale wires.

Operation

Now to briefly summarize the overall operation of the tying mechanism of the invention, it will be seen that before the bale formation is commenced the free end of the bale tie extends upwardly through the bale chamber as indicated at 3a in Figures 1 and 3, the free end 3a being gripped and held between the inner carrier 10 and abutment 12. As the bale is formed against this free end 3a, same will be moved forwardly as indicated by the broken line showing in Figure 3, and thence will continue to move forwardly until at the time the bale is completed it will assume a position substantially as indicated by the numeral 300a in Figure 3, at which time it will be seen that the free end extends forwardly beneath the carrier 10 and between the clamp elements 140 and 140'. At about this time the metering wheel 22 which rotates in engagement with the bale will act through the trip rod 27 to trip the one revolution clutch and thereby institute the one revolution of the driven clutch member 15 together with the primary control shaft 13.

During such revolution cam 137 rotating with control shaft 13 actuates rock shaft 130 and through it causes plunger latch 121 to hold the bale plunger in advanced position. At the same time, rocking of the shaft 130 transmits motion through links 143 to close the bale case clamps 140 to thereby prevent the free ends 3a from being withdrawn from the twister 7 during and responsive to the movement of the needles 9. Meanwhile the crank 50 which rotates with the primary control shaft 13 acts through the pitman 49 to cause a complete reciprocation of the slide 45 and the rack bars 47 and 64 carried thereby. The coaction between the rack bar 47 and pinion 48 causes an oscillation of the needle drive shaft 32 which is transmitted through chains 42 to needle yoke 39, whereupon the needles 9 are projected upwardly through the bale chamber to carry a loop of wire across to the wire carriers 11—11 and then retracted.

At the same time the coaction between the rack bar 64 and pinion 65 caused the tubular crank shaft 59 of the carrier drive to oscillate simultaneously but in opposite directions to the needle drive shaft 32. This acts through the cranks 60 and links 58—61 to project and retract the respective wire carriers 10—11 back and forth along their tracks 52—53 in timed relation to each other and to the needles 9 to lay their respective portions of the wire in the twister 7.

As the tubular crank shaft 59 commences the first phase or stroke of its oscillation, the cam 101 thereon acts through the follower roller 102 on bracket 103 to move slide 99 forwardly (toward the right) whereby the twister 7 is raised by cooperation of its roller 97 with the inclined portion 98 on the slide for subsequent reception of the wires. The twister 7 is retained in its raised position while the wires are laid therein, such retaining being due to action of the latch 106 engaging behind the end of the slide rod or extension 104 under the influence of spring 109.

Then the wire carriers 10 and 11, which have commenced their projection stroke simultaneously with the upward movement of the needles 9 and raising of twister 7, move over the raised twister 7, the carriers 10 at this time laying the free ends 3a of the wires in their associated twister pinions 8. At the same time the outer carriers 11 are projected rearwardly over the twister 7 to meet their respective needles 9 as the latter are projected upwardly through the bale case 2 and to take therefrom the needle loops 3b.

On the return stroke of the carriers 10 and 11, the carriers 11 move in advance of the carriers 10, each carrier 11 laying the lower strand of its needle loop 3b in its associated twister pinion 8 on top of the previously laid free end 3a and also positioning said strand over the abutment 12 in the path of descent of the returning inner carrier 10. The inner carrier 10 then returns to its starting position and clamps the free end 3a against abutment 12.

At this time, the primary control shaft 13 is just completing its one revolution and the coaction between the cam 137 and roller 136 permits return of the rock shaft 130 to its original position. This accordingly acts through the arm 131 and link 133 to release the plunger latch 121 and simultaneously acts through lever 139 and links 143 to release the bale case clamp levers 140. It will be apparent that since the needles 9 are completing their retraction movement at this time, the holding action of the bale case clamps is no longer required.

Substantially simultaneously with the release of the plunger latch 121 and bale case clamp levers 140, the cam 92 acts through roller 93 to rock shaft 90 and disengage stop arm 89 from the driven twister clutch member 86. Accordingly, clutch member 86 instantaneously commences its one revolution, by virtue of which the twister drive shaft 78 is rotated through the gears 84 and 83 to drive the twister pinions 8 for several revolutions.

This of course results in twisting together the overlapping wire strands which have been previously laid within the twister and thus causes completion of the bale tie.

Just as the twister gears 8 are completing their final revolution, the cams 120 on shaft 78 actuate the cutter levers 117 to sever the lower strands of the respective needle loops 3b between each twister gear 8 and inner carrier 10, which functions to then clamp the newly formed free end of wire against abutment 12 during formation of the next bale.

Prior to this wire severing operation the pin 116 on driven twister clutch member 86 will have engaged the depending finger 115 and through it have commenced cocking the inertia member 110 against the spring 113. As the wire severing is completed, the pin 116 rotates out of engagement with depending arm 115 whereupon the spring 113 instantly retracts inertia member 110 forwardly. When the inertia member has been retracted forwardly to the fullest extent permitted by the lost motion connection 111—112 the momentum of the member 110 causes it to impact sharply against pin 112 and thereby rock the latch lever 107 forwardly. This of course releases the slide 99 for immediate rearward movement under the actuation of spring 100 with resulting lowering of the twister 7 and stripping of the wire twist therefrom by the stationary stripper elements 69 and 80.

The completed twist will appear substantially as indicated by the reference character T in Figure 1 and the tension of the wire within the completed tie will urge the stripped tie T to ride outwardly and downwardly over the rounded surfaces of the stripper elements 69 and 80 toward the completed bale to substantially the position of Figure 1. In the event the tension of the wire alone is not sufficient to accomplish this, the subsequent forward movement of the completed bale incident to the forming of a new bale rearwardly thereof will cause the stripped twist to ride outwardly and downwardly over the rounded surfaces of the stripper elements 69 and 80 and twister 7. To this end it will be noted that the adjoining laterally outer surfaces of the twister 7 and strippers all lie flush with each other in the retracted or lowermost position of the twister 7.

In the meantime it will be recalled from the preceding detailed description that the trip rod 27 will have been reset incident to oscillation of the plate 31 with needle drive shaft 32, in readiness to trip the one revolution clutch 15—16 and institute another tying cycle under the actuation of the metering wheel 22.

In this application we have shown and described only the preferred embodiment of our invention simply by way of setting forth the best mode contemplated by us of carrying out our invention, as by law required. However, we recognize that our invention is capable of other and different embodiments and that the preferred embodiment thereof herein shown may be modified in various ways all without departing from our said invention. Accordingly, we wish it to be understood that the drawings and description herein are merely illustrative in nature rather than exclusive.

Having thus described our invention we claim:

1. A wire tying mechanism for hay balers comprising a bale case, a rotary wire twister mounted on said case for rotation about an axis extending longitudinally of the case, a resilient abutment having an operative surface in substantial axial alignment with the twister adjacent one end thereof, needle mechanism for projecting a loop of wire across said bale case, into substantial alignment with the other end of said twister, an inner wire carrier and means guiding same for movement in a curved path around the twister between said abutment and a location aligned with said other end of the twister, said inner wire carrier being normally retracted against said abutment to clamp thereagainst a strand of wire operatively engaged by said carrier, an outer wire carrier guided for movement between said abutment and the point of delivery of said wire loop, and means for projecting and retracting said needle mechanism and said carriers through their paths of movement in timed relation to first cause said inner carrier on its advance stroke to lay said strand of wire in the twister, then to cause said outer carrier to pick up the wire loop from the needle mechanism and lay one side thereof in the twister while simultaneously moving said side into contiguous relation to the resilient abutment, the retraction of the inner carrier by said means being retarded relative to movement of the outer carrier whereby the inner carrier returns into abutting engagement with said abutment after the wire loop is brought thereagainst by the outer carrier.

2. The combination of claim 1 including a wire deflector overlying the path of movement of said inner carrier to guide said loop across said path without interference from the inner carrier, said deflector engaging the said strand of wire on the inner carrier to bend same around the inner carrier and maintain operating tension on said free end during movement of the inner carrier.

3. A wire tying mechanism for hay balers comprising a wire twister rotatable about a predetermined axis, an abutment disposed in axial alignment with the twister adjacent one end thereof, needle mechanism for projecting a loop of wire into axial alignment with the other end of said twister, a first wire carrier normally resting against said abutment to clamp a free end of the said wire thereagainst, means for moving said first wire carrier axially of the twister to lay the free end therein, a second wire carrier and means for moving the same after laying of the free end to pick up said loop and lay one side thereof in the twister beside said previously laid free end, while simultaneously positioning said one side of the loop in contiguous relation to the said abutment, said first mentioned means returning the first carrier to its starting position after such positioning of said one side of the loop to clamp said one side against the abutment, means for operating the twister to interconnect said free end and said one side of the loop, and means for thereafter severing said one side of the loop between the twister and the abutment.

4. The combination of claim 3 wherein the means for moving said carriers comprises a common drive means for operating both of said wire carriers in timed relation to each other and to the needle mechanism.

5. A wire twisting mechanism for hay balers comprising a wire twister rotatable about a predetermined axis, a resilient abutment disposed in axial alignment with the twister adjacent one end thereof, means for projecting a loop of wire adjacent and in substantial axial alignment with the other end of said twister, a first wire carrier normally resting against said abutment to clamp a free end of said wire thereagainst, drive means for moving the first wire carrier axially of the twister to lay the free end therein, a second wire carrier and means operating same after laying of the free end to pick up said loop of wire and lay one side of same in the twister beside the previously laid free end while simultaneously positioning said one side of the loop contiguously to said abutment, said drive means returning the first carrier to its starting position after such positioning of said one side of the loop to clamp same against the abutment, and means for operating said twister to interconnect said free end and said one side of the loop of wire.

6. The combination of claim 5 including means for severing said one side of the loop of wire between the twister and the abutment.

7. A wire tying mechanism for hay balers comprising a wire twister rotatable about a predetermined axis, a resilient abutment disposed in axial alignment with the twister adjacent one end thereof, means for projecting a loop of wire adjacent and in substantial axial alignment with the other end of said twister, a first wire carrier normally resting against said abutment to clamp a free end of said wire thereagainst, drive means for moving said first wire carrier axially of the twister to lay the free end therein, a second wire carrier, and means operating said second wire carrier after laying of the free end to pick up said loop of wire and lay one side of same in the twister beside the previously laid free end while simultaneously positioning said one side of the loop of wire contiguously to the abutment, said drive means returning said first carrier to its starting position to clamp said one side of the loop of wire against the abutment.

8. A wire tying mechanism for hay balers comprising a wire twister rotatable about a predetermined axis, an abutment disposed with an operative face in axil alignment with the twister adjacent one end thereof, means for projecting a wire adjacent and in substantial axial alignment with the other end of said twister, a first wire carrier normally resting against said abutment, means for moving said first wire carrier axially of the twister, a second wire carrier, and drive means operating said second wire carrier to pick up said wire and lay it in the twister while simultaneously positioning the wire contiguously to the said abutment, said drive means returning said first carrier to its starting position to then clamp said wire against the abutment.

9. The combination of claim 8 including means for guiding said wire around the first wire carrier and into the twister.

10. The combination of claim 3 including latch mechanism on the opposite side of the twister from said abutment for retaining said free end in the twister.

11. The combination of claim 3 including a wire deflector overlying the path of movement of said first wire carrier to guide said one side of the loop around and clear of said first wire carrier.

12. The combination of claim 3 including a wire guide disposed to direct said one side of the loop into the twister.

13. The combination of claim 3 including a wire deflector overlying the path of movement of said first wire carrier to guide said one side of the loop around and clear of the first carrier, and a wire guide disposed to direct said one side of the loop into the twister.

14. The combination of claim 3 including a wire deflector overlying the path of movement of said first wire carrier to guide said one side of the loop around and clear of said first wire carrier, a wire guide disposed to direct said one side of the loop into said twister, said deflector presenting a surface closely parallel to the path of movement of said first wire carrier for engaging the wire supported by said second carrier and causing same to bend progressively around said first carrier as the second carrier moves to lay it in the twister, thereby maintaining a proper tension on said wire to insure its reception in the twister.

15. A wire tying mechanism for hay balers comprising a wire twister rotatable about a predetermined axis, an abutment disposed in axial alignment with the twister adjacent one end thereof, needle mechanism for projecting a loop of wire into substantial alignment with the other end of said twister, a first wire carrier normally resting against said abutment, means for moving said first wire carrier axially of the twister, a second wire carrier and means operating same to pick up said loop and lay one side thereof in the twister while simultaneously bringing said one side of said loop into proximity with said abutment, said first mentioned means returning said first carrier to its starting position after such positioning of said one side of the loop to clamp same against the abutment, a wire deflector overlying the path of movement of said first wire carrier to guide said one side of the loop around and clear of said first carrier, said deflector presenting a surface closely paralleling the path of movement of said second carrier for engaging the bitter end of a wire looped around said carrier and causing same to bend progressively around the carrier as the latter moves to lay it in the twister, said surface terminating in a series of teeth adjacent the end of the twister remote from said abutment to engage the bitter end of the wire and retain it in the twister upon retraction of said first wire carrier.

16. A wire tying mechanism for hay balers comprising a wire twister rotatable about a predetermined axis, an inner wire carrier normally in substantial alignment with said twister at one end thereof, means for advancing said carrier in a curved path around said twister in an axial plane thereof and into substantial axial alignment with the opposite end of said twister, whereby a strand of wire engaged by said carrier will be laid in the twister, in combination with needle mechanism for projecting a loop of wire into substantial axial alignment with said twister adjacent the said opposite end of the twister, an outer wire carrier guided for movement around the twister in a curved path outside of and in the same axial plane with the path pursued by said inner carrier, and means advancing said outer carrier simultaneously with said inner carrier to pick up the loop and for then retracting it to lay one side of said loop in the twister along side the previously laid strand of wire.

17. A wire tying mechanism for hay balers comprising a wire twister rotatable about a predetermined axis, a first wire carrier movable through a predetermined curved path in an axial plane of said twister into substantial alignment with one end of said twister to lay a strand of wire therein, a second wire carrier movable past said first carrier through a different predetermined curved path outside of said first path in said axial plane into substantial axial alignment with the opposite end of said twister to lay a second strand of wire therein and across the path of the first carrier, and means for operating said carriers in timed relation to successively lay their respective strands of wire in said twister, said means returning said first carrier to its starting position to engage said second strand of wire.

18. A wire tying mechanism for hay balers comprising a wire twister rotatable about a predetermined axis, a first wire carrier movable through a predetermined curved path in an axial plane of said twister into substantial alignment with one end of said twister to lay a strand of wire therein, a second wire carrier movable past said first carrier through a different predetermined curved path outside of said first path in said axial plane into substantial axial alignment with the opposite end of said twister to lay a second strand of wire therein and across the path of the first carrier, means for operating said carriers in timed relation to successively lay their respective strands of wire in said twister, and means operating said twister following the reception therein of both said strands of wire to unite said strands, said first named means returning the first carrier to its starting position to engage said second strand of wire.

19. A wire tying mechanism for hay balers comprising a wire twister rotatable about a predetermined axis, a first wire carrier movable in an axial plane of said twister in a curved path around said twister into substantial axial alignment with one end of the twister to lay a strand of wire therein, a second wire carrier movable in said axial plane in a curved path around said twister outside of and spaced from said first mentioned path into substantial axial alignment with the opposite end of said twister to lay a second strand of wire therein and across the path of movement of said first carrier, and means for operating said carriers in timed relation to successively lay their respective strands of wire in the twister, said means returning said first carrier to its starting position to engage said second strand.

20. The combination of claim 19 including a wire deflector overlying the path of movement of said first carrier to cause the strand of wire from the second carrier to by-pass said first carrier, and a wire guide positioned to engage said strand and direct it into the twister.

21. A wire tying mechanism for hay balers comprising a wire twister rotatable about a predetermined axis, an inner wire carrier normally in substantial axial alignment with said twister at one end thereof, means for advancing said carrier in a curved path around said twister in an axial plane thereof and into substantial axial alignment with the opposite end of said twister, whereby a strand of wire engaged by said carrier will be laid in the twister, in combination with needle mechanism for projecting a loop of wire into substantial alignment with said twister adjacent the opposite end of the twister, an outer wire carrier, means for guiding said outer wire carrier for axial movement around the twister in a curved path outside of and in the same plane with the path pursued by said inner carrier, means advancing said outer carrier simultaneously with said inner carrier to pick up the said loop and for then retracting it to lay one side of the loop in the twister along side of the previously laid strand of wire, and a wire deflector overlying said inner carrier to cause said one side of the loop to by-pass the inner carrier.

22. A wire tying mechanism for hay balers comprising a wire twister and means supporting same for rotary movement about a predetermined axis, a guide plate mounted adjacent said twister parallel to the rotational axis thereof, said plate being formed with inner and outer curved slots respectively terminating adjacent and in substantial axial alignment with opposite ends of said twister, inner and outer wire carriers guided for movement in the respective slots, and means for successively moving first the inner carrier and then said outer carrier toward the terminal ends of their respective slots to lay first and second strands of wire successively in said twister.

23. The combination of claim 22 including a wire deflector mounted on said plate between said slots and overlying said first carrier to deflect said second strand of wire around and out of engagement with said first carrier.

24. The combination of claim 22 wherein said means for successively moving the inner and outer carriers comprises a crank shaft and pitmans connecting the respective carriers to said crank shaft in different angular positions.

References Cited in the file of this patent

UNITED STATES PATENTS

| | | |
|---|---|---|
| 2,355,644 | Haase | Aug. 15, 1944 |
| 2,528,538 | Nolt | Nov. 7, 1950 |